United States Patent
Vrljes et al.

(10) Patent No.: US 9,919,500 B2
(45) Date of Patent: Mar. 20, 2018

(54) INNER BYPASS DUCT

(71) Applicant: PRATT & WHITNEY CANADA CORP., Longueuil (CA)

(72) Inventors: Ljubisa Vrljes, Etobicoke (CA);
Kin-Leung Cheung, Toronto (CA);
Mathieu Poulin, Toronto (CA);
Michael Haddock, Georgetown (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 602 days.

(21) Appl. No.: 14/499,883

(22) Filed: Sep. 29, 2014

(65) Prior Publication Data

US 2016/0090916 A1    Mar. 31, 2016

(51) Int. Cl.
*F02C 7/045* (2006.01)
*F02C 7/25* (2006.01)
*B32B 33/00* (2006.01)
*F01D 21/04* (2006.01)

(52) U.S. Cl.
CPC ............ *B32B 33/00* (2013.01); *F01D 21/045* (2013.01); *F02C 7/045* (2013.01); *F02C 7/25* (2013.01); *F05D 2250/283* (2013.01); *F05D 2300/612* (2013.01)

(58) Field of Classification Search
CPC . F02C 7/045; F02C 7/25; B32B 33/00; F05D 2250/283; F02K 1/827
USPC ........................................................ 415/119
See application file for complete search history.

(56) References Cited

U.S. PATENT DOCUMENTS

| | | | |
|---|---|---|---|
| 4,235,303 A | 11/1980 | Dhoore et al. | |
| 4,759,513 A * | 7/1988 | Birbragher | B32B 37/146 181/222 |
| 5,478,199 A | 12/1995 | Gliebe | |
| 6,179,943 B1 | 1/2001 | Welch et al. | |
| 6,358,590 B1 | 3/2002 | Blair et al. | |
| 2012/0103638 A1* | 5/2012 | Mickelsen | F02C 7/25 169/46 |
| 2013/0115051 A1 | 5/2013 | Bouchard et al. | |
| 2013/0142624 A1* | 6/2013 | Julliard | B64D 33/06 415/119 |
| 2013/0309070 A1 | 11/2013 | Vrljes et al. | |
| 2015/0118023 A1* | 4/2015 | Caulfeild | F23M 20/005 415/119 |

OTHER PUBLICATIONS

Transwall; Acousticap Reduces Noise by 33 Percent or More; Jun. 9, 2014; transwall.com/acousticap-reduces-noise-by-33-percent-or-more/.*

* cited by examiner

*Primary Examiner* — Richard Edgar
*Assistant Examiner* — Michael Sehn
(74) *Attorney, Agent, or Firm* — Norton Rose Fulbright Canada LLP

(57) ABSTRACT

An inner bypass duct of a gas turbine engine includes a plurality of non-structural front panels arranged circumferentially. Each front panel has an outer surface and an inner surface. The inner surface is at least partially covered by a composite structure. The composite structure includes a fireproof layer and an acoustic layer disposed between the fireproof layer and the inner surface. A non-structural panel for an inner bypass duct and a method of forming such panel are also presented.

19 Claims, 5 Drawing Sheets

INNER BYPASS DUCT

TECHNICAL FIELD

The application relates generally to gas turbine engines and, more particularly, to inner bypass ducts.

BACKGROUND OF THE ART

Turbofan engines generally comprise an annular bypass air passage defined between radially outer and radially inner bypass ducts. The annular bypass air passage directs a bypass air flow drawn by the fan. The inner bypass duct surrounds an engine core including a compressor section, a combustor and a turbine section.

SUMMARY

In one aspect, there is provided an inner bypass duct of a gas turbine engine, the inner bypass duct comprising: a plurality of non-structural front panels arranged circumferentially, each front panel having an outer surface and an inner surface, the inner surface being at least partially covered by a composite structure, the composite structure including a fireproof layer and an acoustic layer disposed between the fireproof layer and the inner surface.

In another aspect, there is provided a non-structural panel for an inner bypass duct of a gas turbine engine, the panel comprising: an inner surface at least partially covered by a composite structure, the composite structure including a fireproof layer and an acoustic layer disposed between the fireproof layer and the inner surface.

In a further aspect, there is provided a method of forming a non-structural panel for an inner bypass duct for a gas turbine engine, the method including: disposing an acoustic layer onto an inner surface of the panel; and bonding a fireproof layer on top of the acoustic layer.

DESCRIPTION OF THE DRAWINGS

Reference is now made to the accompanying figures in which.

DETAILED DESCRIPTION

Figure 1:
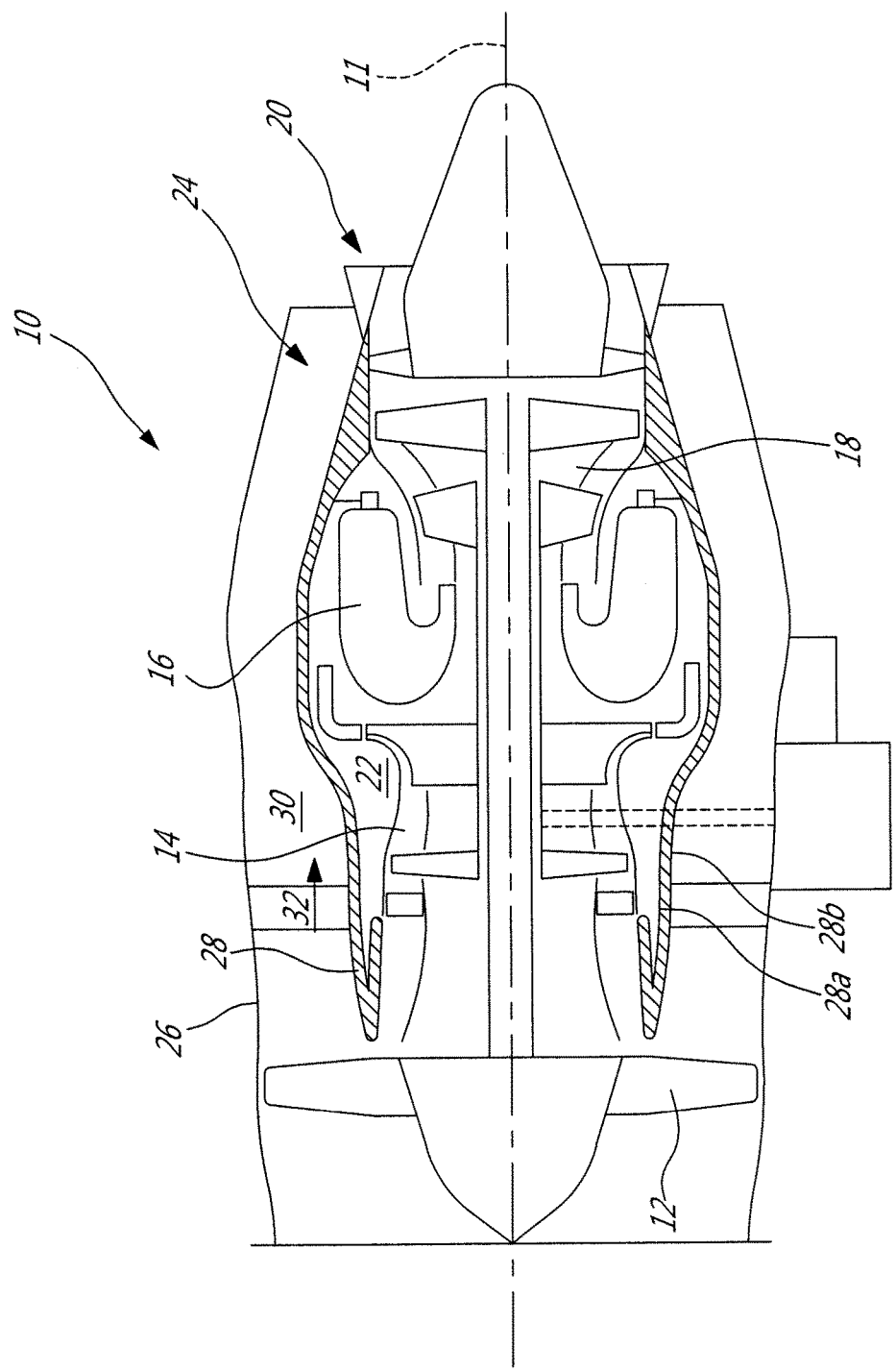
FIG. 1 is a partial schematic cross-sectional view of a gas turbine engine.

FIG. 1 illustrates a gas turbine engine 10 of a type preferably provided for use in subsonic flight, generally comprising in serial flow communication along a centerline 11: a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The compressor section 14 and the turbine section 18 form part of an engine core 20. The engine core 20 defines a main fluid path 22 in which the combustor 16 is provided. The engine core 20 is coaxially positioned within an annular bypass duct 24 including an annular radially outer bypass duct wall 26 and an annular radially inner bypass duct wall 28. The radially outer and inner bypass duct walls 26 and 28 define therebetween an annular bypass air passage 30 for directing a bypass air flow 32 drawn by the fan 12. In contrast to the outer bypass duct wall 26 which perform a structural function in supporting and centering the engine core 20, the inner bypass duct wall 28 is typically not a load transmitting component. The inner bypass duct wall 28 includes an inner surface 28a and an outer surface 28b facing the outer bypass duct wall 26. In one embodiment, the inner bypass duct wall 28 is made of aluminum.

Figure 2:
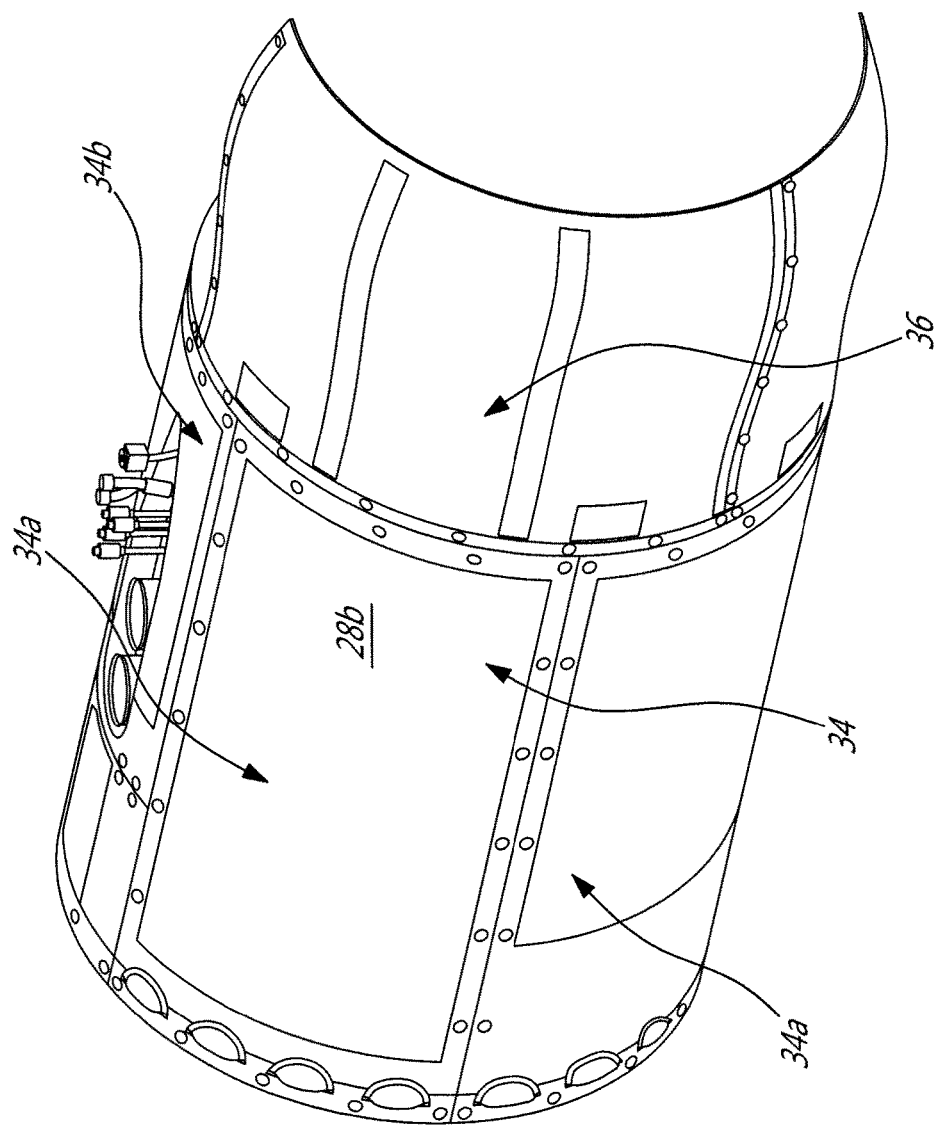
FIG. 2 is a schematic partial perspective view of an outside of an inner bypass duct for the gas turbine engine of FIG. 1.
Figure 3:
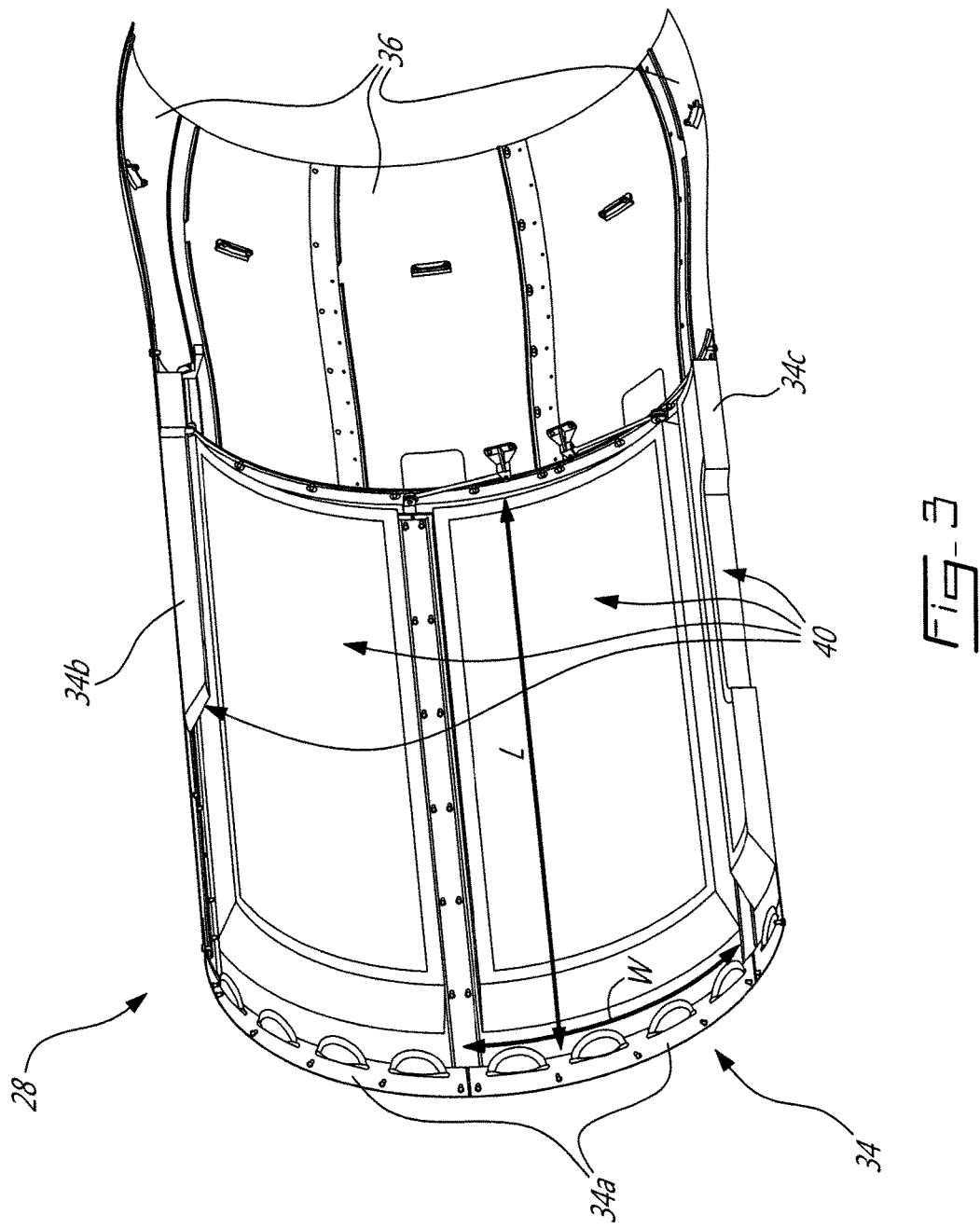
FIG. 3 is a schematic partial perspective view of an inside of the inner bypass duct showing a composite structure on front panels.

Turning now to FIGS. 2 and 3, the inner bypass duct wall 28 may comprise a circumferential array of front panels 34 and a circumferential array of rear panels 36. By way of example, the circumferential array of front panels 34 may comprise four side panels 34a, a top panel 34b, and a bottom panel 34c assembled together to form a continuous cylindrical wall structure. The front panels 34 may be riveted, bolted or otherwise suitably attached to one another along adjoining circumferential edges. In the embodiment shown in the Figures, the circumferential array of rear panels 36 comprises three arcuate panels. However, it is understood that a different number of rear panels 36 could be provided. The rear panels 36 may be provided in the form of sheet metal. Like the front panels 34, the rear panels 36 may be riveted, bolted or otherwise suitably joined along circumferentially adjacent edges. Openings or passages may be defined in the front and rear panels 34 and 36 for allowing mounting of equipment to the engine core or to provide access thereto (see for instance the elongated openings defined in the top front panels 34b). Openings may also be defined in the panels 34 and 36 for allowing the passage of structural elements.

Figure 4:
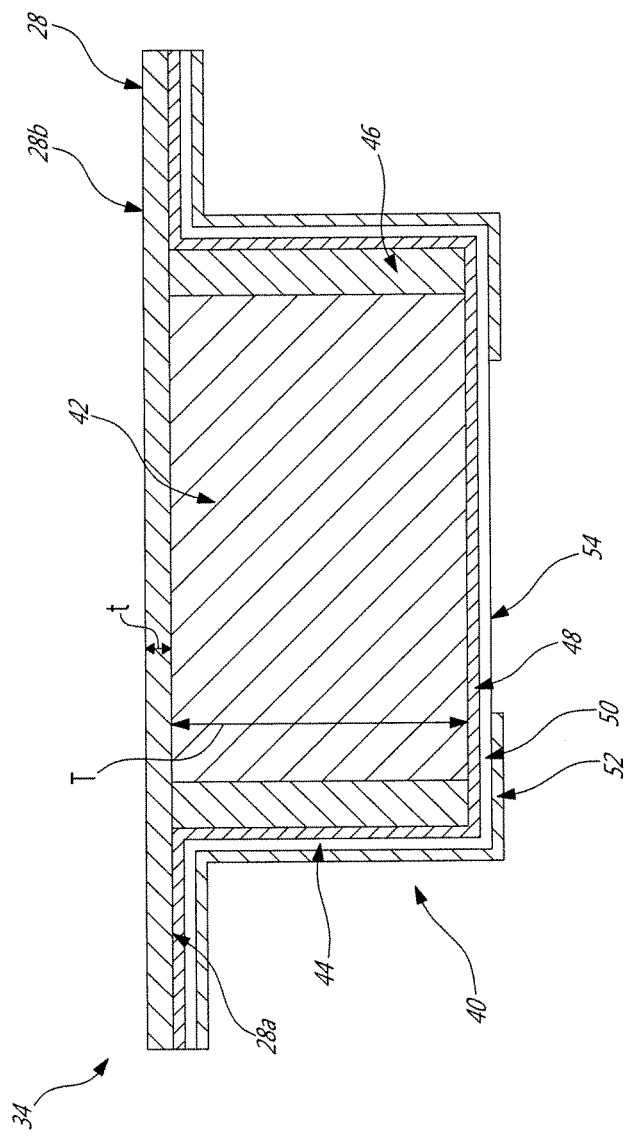
FIG. 4 is a schematic cross-sectional view of one of the front panels with the composite structure according to one embodiment.

Turning now to FIG. 4, an embodiment of the front panels 34 including a composite structure 40 will be described.

The composite structure 40 is formed on the inner surface 28a of the inner bypass duct wall 28 at the front panels 34. While only the front panels 34 are shown herein having the composite structure 40, it is contemplated that some or all of the rear panels 36 could also have a composite structure, which may or may not be similar to the composite structure 40. The side panels 34a, top panels 34b, and bottom panels 34c of the front panels 34, may have the same composite structure 40. It is however contemplated that the composite structure may differ between the front panels 34, according to, for example, given acoustic and/or fireproof requirements. The composite structure 40 is provided on the inner surface 28a to protect the front panels 34 from a potential fire hazard originating from the engine core 20. The composite structure 40 may be bonded to the inner surface 28a by an adhesive or otherwise suitably attached. The composite structure 40 may cover a majority of a surface area of the inner surface 28a at the front panels 34. In one embodiment, the composite structure 40 covers almost up to a width W (shown in FIG. 3) and a length L (shown in FIG. 3) of each of the front panels 34.

Figure 5:
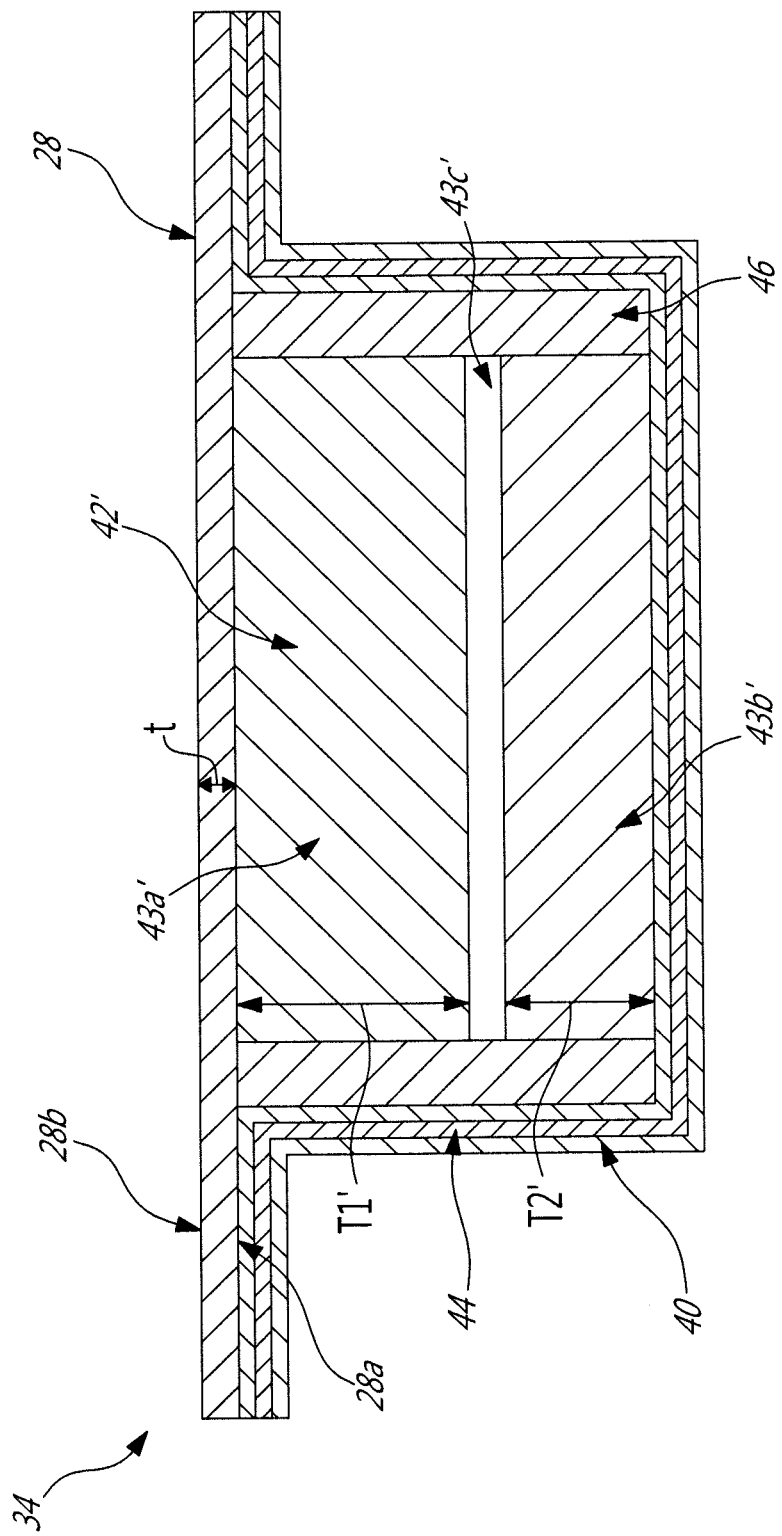
FIG. 5 is a schematic cross-sectional view of one of the front panels with the composite structure according to another embodiment.

The composite structure 40 includes an acoustic layer 42 and a fireproof layer 44 covering the acoustic layer 42. The acoustic layer 42 may have a thickness T that may be at least twice the thickness t of the front panels 34. The acoustic layer 42 may be made of different materials having different acoustic properties depending on given requirements. In one embodiment, the acoustic layer 42 is made of a honeycomb structure. In one embodiment, the acoustic layer 42 includes an Acousti-Cap®. In one embodiment, the honeycomb is made of aluminum. The acoustic layer 42 may be made using combinations of honeycomb thickness, septum, face sheet hole size and hole pattern etc. to attenuate a particular set of frequencies. In yet another embodiment, shown in FIG. 5, an acoustic layer 42' may be made to include a double degree of freedom Acousti-Cap®. A double degree of freedom acoustic treatment may include a first acoustic layer 43a', and a second acoustic layer 43b' separated by a septum 43c'. The septum 43c' may be disposed parallel to the face sheet 28a/28b. The first acoustic layer 43a' and second acoustic layer 43b' have different thickness to attenuate different frequencies. In one embodiment, the septum 43c' is made of aluminum. A thickness T1' of the first acoustic layer 43a' may be bigger than a thickness T2' of the second acoustic layer 43b'. It is contemplated that the first acoustic layer 43a' could have a thickness thinner or thicker than the second acoustic layer 43b'.

Referring back to FIG. 4, the fireproof layer 44 forms a protective capsule to the acoustic layer 42. In one embodiment, the fireproof layer 44 is bonded to the inner surface 28a and to the acoustic layer 42 by adhesives. A foam adhesive 46 may be disposed axially laterally between along the edges of the acoustic layer 42 and between the fireproof layer 44 to close out the cells along the edges.

The fireproof layer 44 includes, in one embodiment, a first layer 48 of fiberglass, a layer 50 of fireproof fabric and a second layer 52 of fiberglass. Other layering and types of fireproof layer 44 are contemplated. For example, there could be more than one layer of fireproof fabric 50 separated or not by yet another layer of fiberglass. In another example, the fireproof fabric 50 is a ceramic fiber material. The first layer 48 of fiberglass may completely cover the acoustic layer 42, while the second layer 52 of fiberglass may have one or more openings exposing a portion of the fireproof fabric 50, such as opening 54 to reduce a total weight of the composite structure 40. The second layer 52 could have one big opening or a plurality of smaller openings throughout. It is also contemplated that only a portion of the acoustic layer 42 could be covered by the fiberglass layer 44. It is also contemplated that the second layer 52 of fiberglass may completely cover the layer 50 of fireproof fabric. The first layer 48 and second layer 52 of fiberglass sandwich the layer of fireproof fabric 50 and are bonded to it by an adhesive or otherwise suitably attached. The first layer 48 and second layer 52 may be rigid while the fireproof fabric 50 may be flexible. It is contemplated that one or both of the first layer 48 and second layer 52 of fiberglass could be omitted.

The use of fiberglass and fireproof fabric may allow for a light yet resistant construction of the composite structure. In addition, the use of adhesives may also reduce the weight of the composite structure. The composite structure may be easily incorporated into the panels without burdensome costs.

The above description is meant to be exemplary only, and one skilled in the art will recognize that changes may be made to the embodiments described without departing from the scope of the invention disclosed. Other modifications which fall within the scope of the present invention will be apparent to those skilled in the art, in light of a review of this disclosure, and such modifications are intended to fall within the appended claims.

The invention claimed is:

1. An inner bypass duct wall of a gas turbine engine, the inner bypass duct wall comprising:
   a plurality of non-structural front panels arranged circumferentially, each front panel having an outer surface and an inner surface, the inner surface being at least partially covered by a composite structure, the composite structure including a fireproof layer and an acoustic layer disposed between the fireproof layer and the inner surface, the acoustic layer extending from the inner surface by a thickness, the fireproof layer contacting the inner surface and projecting from the inner surface to encapsulate at least partially the acoustic layer with the front panel.

2. The inner bypass duct wall of claim 1, wherein the fireproof layer covers completely the acoustic layer projecting from the inner surface.

3. The inner bypass duct wall of claim 1, wherein the fireproof layer includes a first rigid layer covering at least partially the acoustic layer, a fireproof material layer covering at least partially the first rigid layer.

4. The inner bypass duct wall of claim 3, wherein the fireproof layer includes a second rigid layer covering at least partially the fireproof material layer.

5. The inner bypass duct wall of claim 4, wherein the first rigid layer and the second rigid layer are made of fiberglass.

6. The inner bypass duct wall of claim 4, wherein the second rigid layer includes at least one opening exposing a portion of the fireproof material layer.

7. The inner bypass duct wall of claim 1, wherein the acoustic layer includes a honeycomb structure.

8. The inner bypass duct wall of claim 1, wherein the acoustic layer includes a double-degrees-of-freedom acoustic material.

9. The inner bypass duct wall of claim 1, wherein at least one of the acoustic layer and the fireproof layer is connected to a rest of the composite structure and the inner surface of each of the front panels by an adhesive.

10. The inner bypass duct wall of claim 1, further comprising a foam adhesive disposed laterally axially between the acoustic layer and the fireproof layer.

11. The inner bypass duct wall of claim 1, wherein the inner surface is made of aluminum.

12. A non-structural panel for an inner bypass duct wall of a gas turbine engine, the panel comprising:
    an inner surface at least partially covered by a composite structure, the composite structure including a fireproof layer and an acoustic layer disposed between the fireproof layer and the inner surface, the acoustic layer extending from the inner surface by a thickness, the fireproof layer contacting the inner surface and projecting from the inner surface to encapsulate at least partially the acoustic layer with the front panel.

13. The non-structural panel of claim 12, wherein the fireproof layer covers completely the acoustic layer projecting from the inner surface.

14. The non-structural panel of claim 12, wherein the fireproof layer includes a first rigid layer covering at least partially the acoustic layer, a fireproof material layer covering at least partially the first rigid layer, and a second rigid layer covering at least partially the first rigid layer.

15. The non-structural panel of claim 14, wherein the first rigid layer and the second rigid layer are made of fiberglass.

16. The non-structural panel of claim 12, wherein the acoustic layer includes a honeycomb structure.

17. The non-structural panel of claim 12, further comprising a foam adhesive disposed laterally axially between the acoustic layer and the fireproof layer.

18. A method of forming a non-structural panel for an inner bypass duct wall for a gas turbine engine, the method including:
- disposing an acoustic layer onto an inner surface of the panel; and
- bonding a fireproof layer on top of the acoustic layer, the fireproof layer contacting the inner surface and projecting from the inner surface to encapsulate at least partially the acoustic layer with the front panel.

19. The method of claim 18, wherein disposing an acoustic layer onto the inner surface of the panel comprises bonding the acoustic layer onto the inner surface.

\* \* \* \* \*